Jan. 28, 1941.   E. E. VAN CLEAVE   2,229,827
HAND BRAKE
Filed March 15, 1940   3 Sheets-Sheet 1
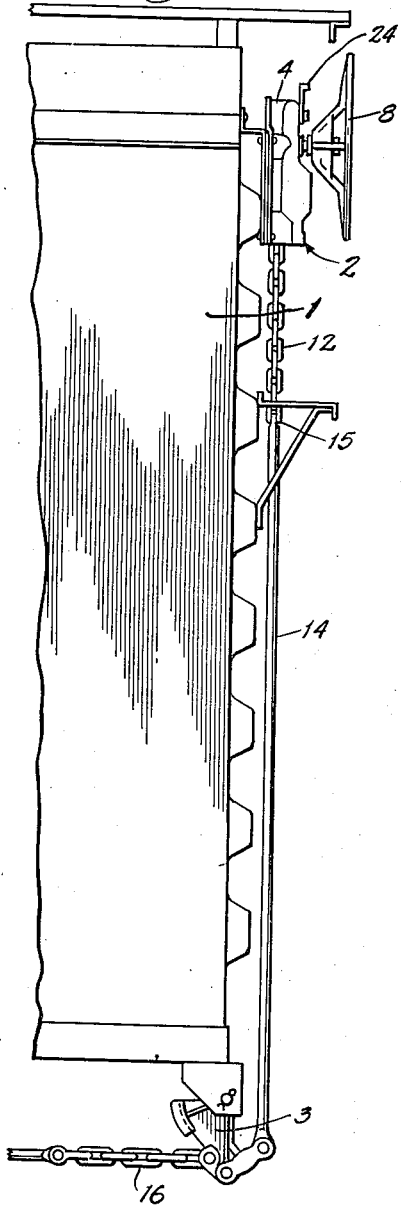
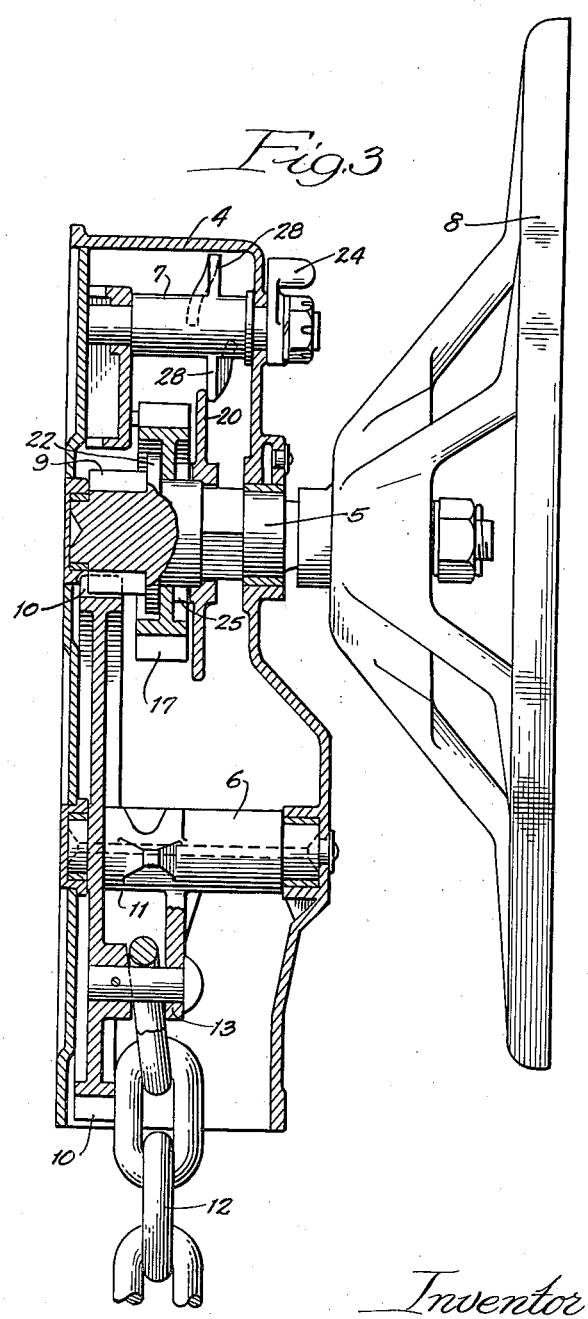
Inventor:
Edwin E. Van Cleave,
By Rummler, Rummler & Davis
Attorneys

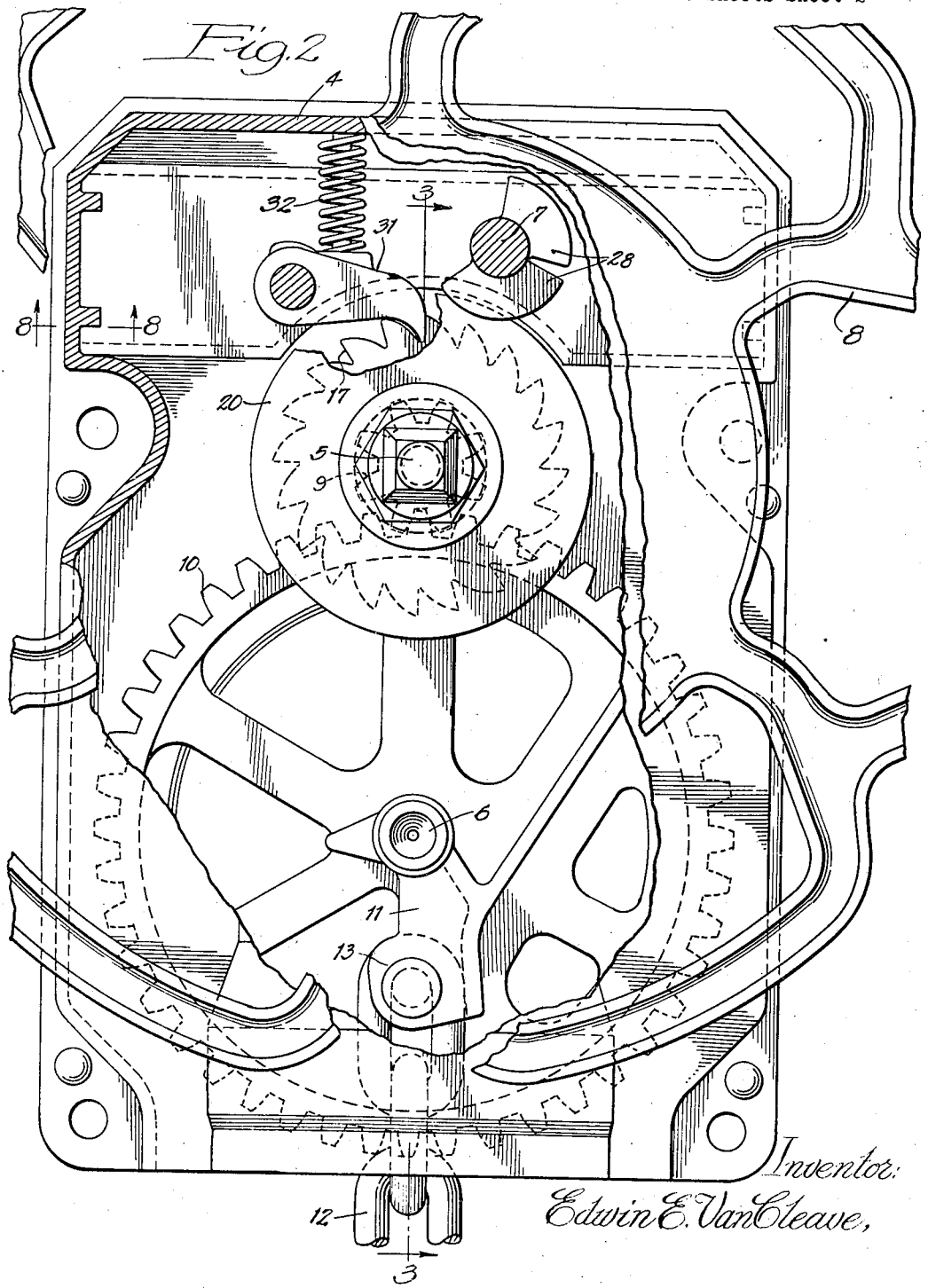

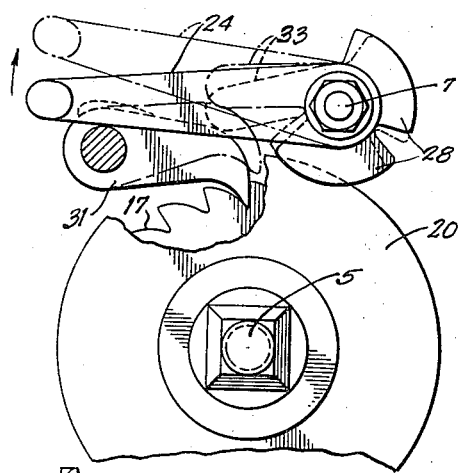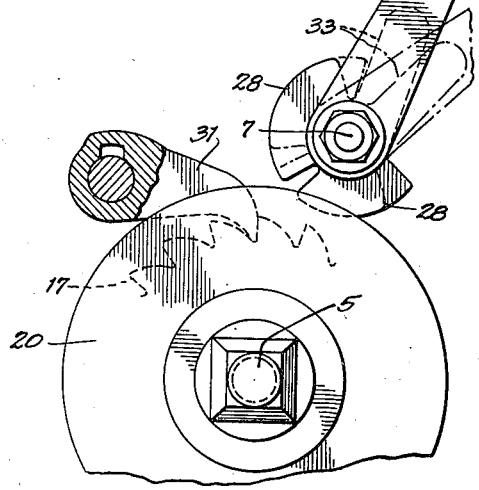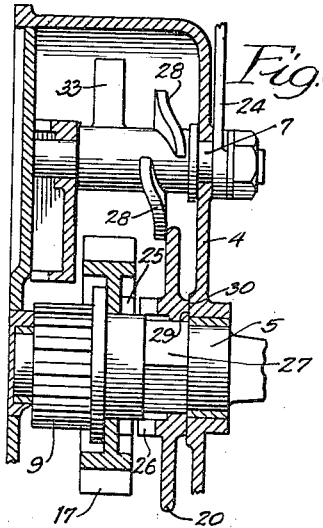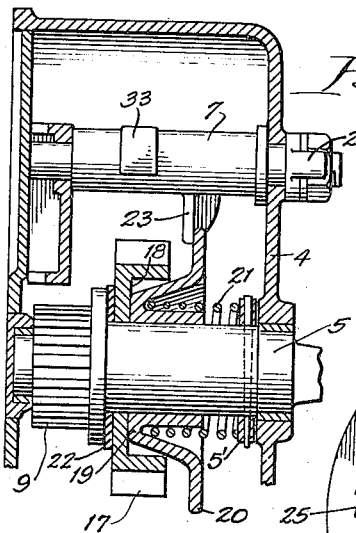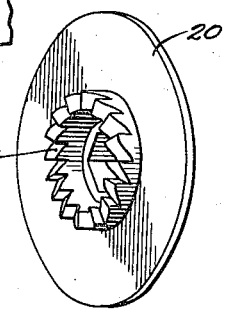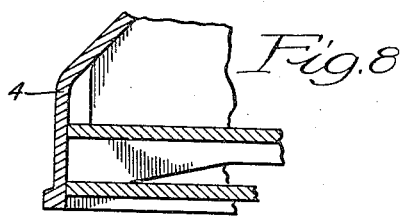

Patented Jan. 28, 1941

2,229,827

UNITED STATES PATENT OFFICE 2,229,827

HAND BRAKE

Edwin E. Van Cleave, Chicago, Ill.

Application March 15, 1940, Serial No. 324,043

7 Claims. (Cl. 74—505)

This invention relates to railway car hand brakes which are used for supplementing the air brake system to provide individual hand control of each car. The invention especially relates to improvements in the releasing means of railway car hand brakes.

Brakes of this nature may be divided into two classes, those having a direct mechanical connection between the hand wheel and the brake mechanism and those dependent upon clutches for connecting the wheel and the brake mechanism.

In practice it has been found desirable to employ the former type in order to avoid the possibility of the operator losing control due to accidental failure of the clutch to engage. In consideration of this preference the improvements are designed to conform to brakes of the positive drive type.

Customary brake mechanisms are held from reverse rotation by a ratchet wheel and pawl and are released by forcing the pawl from the ratchet teeth against the pressure from the car brakes. This is more or less an improvised operation and results in considerable wear on the teeth. The practice of securing a graduated release through alternate disengagement and re-engagement of the pawl and ratchet increases the liability of damage to these parts. Additionally, the engaging surfaces of the pawl and ratchet are of insufficient area for durability under the concentration of wear at these points.

The use of sharply under-cut ratchet teeth, which is desirable for secure engagement between the pawl and the ratchet wheel, makes release by the above described method impossible. Therefore, in customary ratchet wheels, the angle of the ratchet teeth is increased beyond that best for safe interlocking of the ratchet and pawl. Unavoidable wear produces a further increase in the angle of the teeth with the result that the angle soon becomes insufficent to insure holding.

To eliminate these drawbacks, the invention is directed toward the provision of an inexpensive hand brake mechanism employing standard parts in which the pawl and ratchet are used as holding members only, thereby allowing the ratchet wheel to have sharply inclined teeth. A further aim is the provision for a finely graduated release which may be increased or lessened instantly without jarring the working parts. Another purpose is an increase in the engaging surface areas of the release parts through an arrangement wherein the brunt of the release action is born by a clutch and thus more widely distributed than is possible in the pawl and ratchet method. To these ends a principal object is the replacement of the pawl release method with a clutch for locking the hand wheel shaft to the ratchet wheel, the clutch arrangement being such that there is always a positive drive between the hand wheel and the brake mechanism. A secondary object, where toothed clutch elements are employed, is to prevent instant re-engagement of the working parts after the release action, thereby lessening the possibility of jarring the mechanism.

An embodiment of the improvement is illustrated by the accompanying drawings, wherein:

Figure 1 is a side elevation of the end of a railway car showing the improved hand brake attached thereto.

Fig. 2 is a front view of the winding mechanism in which a housing is shown partly broken away and in which a hand wheel is fragmentarily indicated.

Fig. 3 is a sectional view of the mechanism taken on the line 3—3 of Fig. 2.

Fig. 4 is a detail view of a ratchet wheel and pawl, showing a clutch carrying flange by which the drive shaft is clutched and unclutched from the ratchet wheel through the action of a spiral cam shown above the ratchet wheel.

Fig. 5 is a view of the mechanism shown in Fig. 4 in the released position.

Fig. 6 is a side view of the mechanism shown in Figs. 4 and 5, wherein a tooth clutch is employed.

Fig. 7 is a view of a similar device in which the toothed clutch is replaced by a friction clutch arrangement.

Fig. 8 is a fragmentary detail view of a preferred housing design taken on the line 8—8 of Fig. 2.

Fig. 9 is a perspective view of the toothed clutch.

A customary winding mechanism includes a winding drum, a gear integral therewith, a pinion meshing with the gear, a ratchet wheel and pawl, a housing journalling the drum and pinion shafts, and hand wheel for the pinion shaft.

In the improved arrangement the ratchet wheel is loose on the pinion shaft and the pawl is in constant engagement with the ratchet teeth. The pinion is locked to the ratchet wheel by an arrangement wherein a friction clutch disc is carried between the ratchet wheel and the pinion. A slidable clutching member is carried on the pinion shaft and bears against the opposite surface of the ratchet wheel. Engagement of the clutch members is produced by a spring. Release of the pinion from the ratchet wheel is accomplished by a handle operated spiral cam actuating the slidable clutching member. The cam shifts the clutching member away from the ratchet wheel against tension of the spring.

Referring to Fig. 1 of the drawings, 1 designates a railway car, 2, the improved winding mechanism as a whole, and 3 a customary bell crank through which the winding mechanism acts on the brakes.

In a housing 4 for the winding mechanism are journalled shafts 5, 6 and 7, Figs. 2 and 3. A hand wheel 8 is affixed to the outer end of shaft 5 for the purpose of imparting rotation to shaft 6 through a pinion 9 and a gear 10 carried at the inner ends of shafts 5 and 6, respectively. A brake drum 11 is integral with shaft 6 and a brake chain 12 is fastened to drum 11 as indicated at 13.

As customary, the chain 12 is connected to the car brakes by a brake rod 14 leading from the end 15 of the brake chain to bell crank 3, from which a chain 16 leads to the brakes.

A ratchet wheel 17 is loose on shaft 5 and a clutch surface 18 is integral with one side of the ratchet (Fig. 7). A clutching member 19 having a flange 20 is carried loosely on shaft 5 and urged against surface 18 by a spring 21 compressed on shaft 5 between clutching member 19 and a collar 5' fast to the shaft. A clutch disc 22 is carried on shaft 5 between pinion 9 and ratchet 17 so that pressure from spring 21 frictionally locks ratchet 17 to pinion 9.

For the purpose of shifting clutching member 19 away from engagement with surface 18, flange 20 is abutted by a spiral cam 23 carried on shaft 7. Actuation of the cam is produced by a handle 24 carried on shaft 7 outside housing 4.

Another form of the device (Fig. 6) replaces surface 18 with a toothed clutch element 25, and clutching member 19 with a cooperating toothed clutch 26. Clutch 26 slidably fits a squared portion 27 of the shaft 5. In this case clutch flange 20 is encompassed by a spiral cam 28 instead of cam 23. In other respects the designs are similar except that flange 20 is also provided with a retarding friction surface 29 so that if desired the flange 20 may be further shifted beyond the released position to bring the retarding disc 29 into engagement with a cooperating disc 30 fixed to the housing 4. Jarring of the parts, as a result of re-application of the brakes before they are fully released, is lessened by so shaping cam 28 that the time required in shifting handle 24 from released to applied position is sufficient to allow for some dissipation of pull from the brake chain before the parts may be re-engaged.

A pawl 31 is kept in constant engagement with the ratchet wheel by a spring 32 (Fig. 2). Should the pawl 31 bind in disengaged position the operating arm 24 may be pressed down to force the pawl back into engagement. For this purpose handle 24 carries a pawl cam 33 as shown in Fig. 4.

In applying the brakes, hand wheel 8 is rotated clockwise thereby winding chain 12 on drum 11 through pinion 9 and gear 10. During this operation pawl 31 rides over ratchet wheel 17 until the rotation of hand wheel 8 is discontinued, when the pawl prevents reverse rotation of the mechanism.

To release shaft 5 from the ratchet wheel 17, handle 24 is shifted from the full line position of Fig. 4 to that of Fig. 5, thus moving clutching member 19 out of engagement with surface 18. For a graduated release of the brakes, the clutch may be slowly or rapidly engaged and disengaged alternately without harm to the mechanism. In the case of a toothed clutch, the procedure is the same, except that modification of the release speed is accomplished by retarding surfaces 29 and 30.

I claim:

1. A winding mechanism of the character described comprising a winding drum, a gear fast therewith, a pinion meshing with the gear, shafts for the drum and the pinion, a hand wheel fast to the pinion shaft, a ratchet wheel loose on the pinion shaft, a pawl in constant engagement with the ratchet wheel, a clutch member fast with said ratchet wheel, a second clutch member rotatably connected to the pinion shaft and slidable longitudinally thereof for engaging said ratchet wheel clutch member, a cam for shifting the movable clutching member into and out of engagement with the ratchet wheel clutch member, manually operated means for actuating the cam, a friction surface on the opposite face of said movable clutch member, and a fixed surface arranged to cooperate with said friction surface for retarding movement of the pinion shaft after the movable clutching member is removed from engagement with the ratchet wheel clutch member.

2. A winding mechanism of the character described including a winding drum, a gear fast therewith, a pinion meshing with the gear, shafts for the drum and the pinion, a hand wheel fast to the pinion shaft, a ratchet wheel loose on the pinion shaft, a pawl in constant engagement with the ratchet wheel, means for locking the ratchet wheel to the pinion including a clutch disc between the ratchet wheel and the pinion, a clutch surface on the opposite side of the ratchet wheel, a clutching member slidably carried by the pinion shaft for engaging the clutch surface, a spring for urging the clutching member against the clutch surface, a cam for shifting the clutching member away from the clutch surface, and manually operated means for actuating the cam.

3. In a winding mechanism of the character described including a hand wheel having a constant positive drive connection to the winding mechanism, a ratchet wheel and a pawl in constant engagement therewith arranged for preventing reverse rotation of the winding mechanism, a clutch for connecting and disconnecting the winding mechanism and the ratchet wheel, and manually controlled means distinct from the hand wheel for operating the clutch.

4. A winding mechanism of the character described comprising a winding drum, gearing for operating said winding drum, a hand wheel for operating said gearing arranged for a constant positive drive connection between the hand wheel and the gearing, a ratchet wheel and a pawl in constant engagement therewith for preventing reverse rotation of said gearing, means including a clutch for connecting and disconnecting said gearing and said ratchet wheel, and manually controlled means distinct from the hand wheel for operating the clutch.

5. A winding mechanism of the character described, comprising a winding drum, gearing for operating said winding drum, a hand wheel for operating said gearing arranged for constant positive drive connection between the hand wheel and the gearing, a ratchet wheel and a pawl in constant engagement therewith for preventing reverse rotation of said gearing, means including a clutch for connecting and disconnecting said gearing and said ratchet wheel, manually controlled means distinct from the hand wheel for operating the clutch, and a fixed retarding element for the winding mechanism rendered effective by disengagement of the clutch.

6. A winding mechanism of the character described including a winding drum, a gear fast therewith, a pinion meshing with the gear, shafts for the drum and the pinion, a hand wheel fast to the pinion shaft, a ratchet wheel loose on the pinion shaft, a pawl in constant engagement with the ratchet wheel, means for locking the ratchet wheel to the pinion including a clutch disc between the ratchet wheel and the pinion, a clutch surface on the opposite side of the ratchet wheel, a clutching member slidably carried by the pinion shaft for engaging the clutch surface, a spring for urging the clutching member against the clutch surface, and manually operated means for regulating the pressure of the clutch against the ratchet wheel.

7. A winding mechanism of the character described including a winding drum, a gear fast therewith, a pinion meshing with the gear, shafts for the drum and the pinion, a hand wheel fast to the pinion shaft, a ratchet wheel loose on the pinion shaft, a pawl in constant engagement with the ratchet wheel, means for locking the ratchet wheel to the pinion including a clutch disc between the ratchet wheel and the pinion, a clutch surface on the opposite side of the ratchet wheel, a clutching member slidably carried by the pinion shaft for engaging the clutch surface and manually operated means for regulating the pressure of the clutch against the ratchet wheel.

EDWIN E. VAN CLEAVE.